(12) United States Patent
Cao et al.

(10) Patent No.: US 11,294,081 B2
(45) Date of Patent: Apr. 5, 2022

(54) METHODS OF RECOVERING RADIATION DETECTOR

(71) Applicant: SHENZHEN XPECTVISION TECHNOLOGY CO., LTD., Shenzhen (CN)

(72) Inventors: Peiyan Cao, Shenzhen (CN); Yurun Liu, Shenzhen (CN)

(73) Assignee: SHENZHEN XPECTVISION TECHNOLOGY CO., LTD., Shenzhen (CN)

( * ) Notice: Subject to any disclaimer, the term of this patent is extended or adjusted under 35 U.S.C. 154(b) by 104 days.

(21) Appl. No.: 16/919,758

(22) Filed: Jul. 2, 2020

(65) Prior Publication Data

US 2020/0333479 A1 Oct. 22, 2020

Related U.S. Application Data

(63) Continuation of application No. PCT/CN2018/075179, filed on Feb. 3, 2018.

(51) Int. Cl.
*G01T 1/24* (2006.01)
*G01J 1/44* (2006.01)
(Continued)

(52) U.S. Cl.
CPC ............... *G01T 1/247* (2013.01); *G01J 1/44* (2013.01); *G01T 1/17* (2013.01); *G06F 21/30* (2013.01);
(Continued)

(58) Field of Classification Search
CPC ..... G01T 1/247; G01T 1/17; G01T 1/24; G01J 1/44; G06F 21/30; H01L 27/14614; H01L 27/14659; H01L 27/14661
See application file for complete search history.

(56) References Cited

U.S. PATENT DOCUMENTS

| | | | |
|---|---|---|---|
| 8,013,339 B2 * | 9/2011 | Shih | H01L 29/4908 257/59 |
| 2004/0142518 A1 * | 7/2004 | Yu | H01L 29/513 438/197 |
| 2018/0008215 A1 | 1/2018 | Wayama et al. | |

FOREIGN PATENT DOCUMENTS

| CN | 1751393 A | 3/2006 |
|---|---|---|
| CN | 1890957 A | 1/2007 |

(Continued)

OTHER PUBLICATIONS

PCT/CN2018/075179 ISA210 ISR dated Nov. 7, 2018.
(Continued)

*Primary Examiner* — Seung C Sohn
(74) *Attorney, Agent, or Firm* — IPRO, PLLC; Qian Gu

(57) ABSTRACT

Disclosed herein is a method of recovering performance of a radiation detector, the radiation detector comprising: a radiation absorption layer configured to absorb radiation particles incident thereon and generate an electrical signal based on the radiation particles; an electronic system configured to process the electrical signal, the electronic system comprising a transistor, the transistor comprising a gate insulator with positive charge carriers accumulated therein due to exposure of the gate insulator to radiation; the method comprising: removing the positive charge carriers from the gate insulator by establishing an electric field across the gate insulator.

29 Claims, 15 Drawing Sheets

(51) Int. Cl.
*G01T 1/17* (2006.01)
*G06F 21/30* (2013.01)
*H01L 27/146* (2006.01)

(52) U.S. Cl.
CPC .. *H01L 27/14614* (2013.01); *H01L 27/14659* (2013.01); *H01L 27/14661* (2013.01)

(56) References Cited

FOREIGN PATENT DOCUMENTS

| CN | 201852941 U | 6/2011 |
| CN | 102196194 A | 9/2011 |
| WO | 2018006258 A1 | 1/2018 |

OTHER PUBLICATIONS

Shin, Jae Heon, et al. "Light effects on the bias stability of transparent ZnO thin film transistors." Etri Journal 31.1 (2009): 62-64.
Lee, Sungsik, et al. "Oxygen defect-induced metastability in oxide semiconductors probed by gate pulse spectroscopy." Scientific reports 5.1 (2015): 1-10.
Rajeev, K. Prabha, et al. "Electrical analysis of hysteresis in solution processed silicon nanowire field effect transistors." arXiv preprint arXiv:1507.04719 (2015).
Lipkin, L., A. Reisman, and C. K. Williams. "Hole trapping phenomena in the gate insulator of as fabricated insulated gate field effect transistors" Journal of applied physics 68.9 (1990): 4620-4633.

* cited by examiner

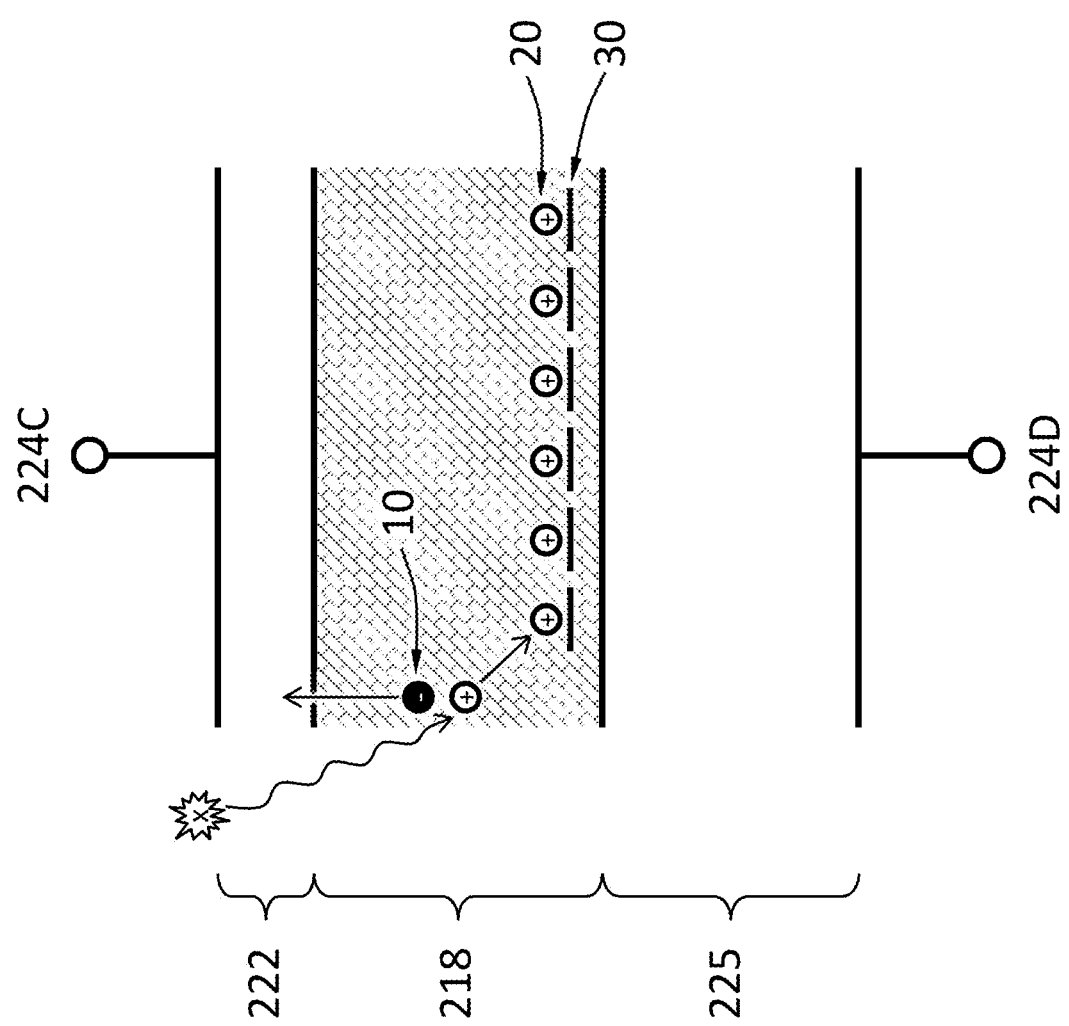

ic system com-
METHODS OF RECOVERING RADIATION DETECTOR

TECHNICAL FIELD

The disclosure herein relates to methods of recovering radiation detectors, particularly relates to methods of recovering the radiation detectors from radiation damage.

BACKGROUND

A radiation detector is a device that measures a property of a radiation. Examples of the property may include a spatial distribution of the intensity, phase, and polarization of the radiation. The radiation may be one that has interacted with a subject. For example, the radiation measured by the radiation detector may be a radiation that has penetrated or reflected from the subject. The radiation may be an electromagnetic radiation such as infrared light, visible light, ultraviolet light, X-ray or γ-ray. The radiation may be of other types such as α-rays and β-rays.

One type of radiation detectors is based on interaction between the radiation and a semiconductor. For example, a radiation detector of this type may have a semiconductor layer that absorbs the radiation and generate charge carriers (e.g., electrons and holes) and circuitry for detecting the charge carriers.

SUMMARY

Disclosed herein is a method of recovering performance of a radiation detector, the radiation detector comprising: a radiation absorption layer configured to absorb radiation particles incident thereon and generate an electrical signal based on the radiation particles; an electronic system configured to process the electrical signal, the electronic system comprising a transistor, the transistor comprising a gate insulator with positive charge carriers accumulated therein due to exposure of the gate insulator to radiation; the method comprising: removing the positive charge carriers from the gate insulator by establishing an electric field across the gate insulator.

According to an embodiment, removing the positive charge carriers comprises annealing the gate insulator.

According to an embodiment, the method further comprises: receiving a code; determining whether the code is valid; wherein the positive charge carriers are removed from the gate insulator only when the code is valid.

According to an embodiment, the transistor comprises a gate electrode; wherein establishing the electric field comprises applying a bias voltage on the gate electrode.

According to an embodiment, applying the bias voltage on the gate electrode comprises connecting the gate electrode to a voltage source.

According to an embodiment, applying the bias voltage on the gate electrode comprises limiting the bias voltage by a limiter.

According to an embodiment, the transistor comprises a source and a drain; wherein the bias voltage on the gate electrode is with respect to the source or the drain.

According to an embodiment, the source and the drain are at a same electrical potential.

According to an embodiment, the bias voltage has a magnitude below a breakdown voltage of the gate insulator.

According to an embodiment, the bias voltage has a magnitude greater than 90% of a breakdown voltage of the gate insulator.

According to an embodiment, the transistor is a MOSFET.

According to an embodiment, the electronic system comprises: a voltage comparator configured to compare a voltage of an electrical contact of the radiation absorption layer to a first threshold; a counter configured to register a number of radiation particles absorbed by the radiation absorption layer; a controller; a voltmeter; wherein the controller is configured to start a time delay from a time at which the voltage comparator determines that an absolute value of the voltage equals or exceeds an absolute value of the first threshold; wherein the controller is configured to cause the voltmeter to measure the voltage upon expiration of the time delay; wherein the controller is configured to determine a number of radiation particles by dividing the voltage measured by the voltmeter by a voltage that a single radiation particle would have caused on the electrical contact of the radiation absorption layer; wherein the controller is configured to cause the number registered by the counter to increase by the number of radiation particles.

According to an embodiment, the controller comprises the transistor.

According to an embodiment, the voltage comparator comprises the transistor.

According to an embodiment, the radiation detector further comprises a capacitor electrically connected to the electrical contact of the radiation absorption layer, wherein the capacitor is configured to collect charge carriers from the electrical contact of the radiation absorption layer.

According to an embodiment, the controller is configured to deactivate the voltage comparator at a beginning of the time delay.

According to an embodiment, the first threshold is 5-10% of a voltage a single photon generates on the electrical contact of the radiation absorption layer.

Disclosed herein is a radiation detector, comprising: a radiation absorption layer configured to absorb radiation particles incident thereon and generate an electrical signal based on the radiation particles; an electronic system configured to process the electrical signal, the electronic system comprising a transistor, the transistor comprising a gate insulator with positive charge carriers accumulated therein due to exposure of the gate insulator to radiation; and a processor configured to remove the positive charge carriers from the gate insulator by establishing an electric field across the gate insulator.

According to an embodiment, the processor is configured to remove the positive charge carriers from the gate insulator by annealing the gate insulator.

According to an embodiment, the processor is configured to receive a code, determine whether the code is valid, and remove the positive charge carriers from the gate insulator only when the code is valid.

According to an embodiment, the transistor comprises a gate electrode; wherein the processor is configured to remove the positive charge carriers from the gate insulator by establishing the electric field by applying a bias voltage on the gate electrode.

According to an embodiment, the processor is configured to apply the bias voltage with a magnitude greater than 90% of a breakdown voltage of the gate insulator.

According to an embodiment, the radiation detector further comprises a heating element configured to heat the gate insulator.

According to an embodiment, the electronic system comprises: a voltage comparator configured to compare a voltage of an electrical contact of the radiation absorption layer to a first threshold; a counter configured to register a number of radiation particles absorbed by the radiation absorption layer; a controller; a voltmeter; wherein the controller is configured to start a time delay from a time at which the voltage comparator determines that an absolute value of the voltage equals or exceeds an absolute value of the first threshold; wherein the controller is configured to cause the voltmeter to measure the voltage upon expiration of the time delay; wherein the controller is configured to determine a number of radiation particles by dividing the voltage measured by the voltmeter by a voltage that a single radiation particle would have caused on the electrical contact; wherein the controller is configured to cause the number registered by the counter to increase by the number of radiation particles.

According to an embodiment, the controller comprises the transistor.

According to an embodiment, the voltage comparator comprises the transistor.

According to an embodiment, the radiation detector further comprises a capacitor electrically connected to the electrical contact of the radiation absorption layer, wherein the capacitor is configured to collect charge carriers from the electrical contact of the radiation absorption layer.

According to an embodiment, the controller is configured to deactivate the voltage comparator at a beginning of the time delay.

According to an embodiment, the first threshold is 5-10% of a voltage a single photon generates on the electrical contact of the radiation absorption layer.

BRIEF DESCRIPTION OF FIGURES

FIG. 3A schematically shows a process of hole-accumulation in the gate insulator of the MOSFET.

DETAILED DESCRIPTION

Figure 1:
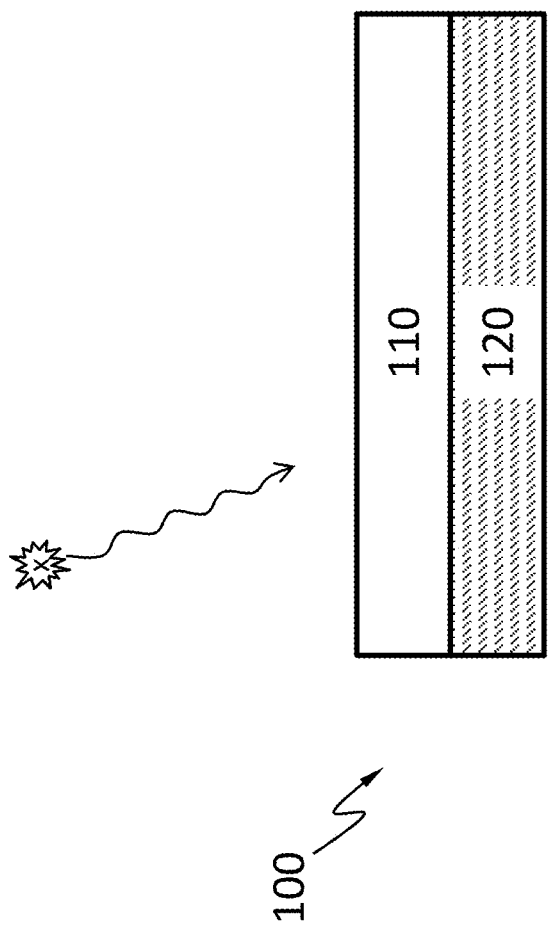
FIG. 1 schematically shows a cross-sectional view of a radiation detector, according to an embodiment.

FIG. 1 schematically shows a cross-sectional view of a radiation detector 100, according to an embodiment. The radiation detector 100 may include a radiation absorption layer 110 and an electronics layer 120 (e.g., an ASIC) for processing or analyzing electrical signals incident radiation generates in the radiation absorption layer 110. The radiation detector 100 may or may not include a scintillator. The radiation absorption layer 110 may include a semiconductor material such as, silicon, germanium, GaAs, CdTe, CdZnTe, or a combination thereof. The semiconductor may have a high mass attenuation coefficient for the radiation of interest.

The electronics layer 120 may comprise an electronic system (e.g., 121 in FIG. 7A or FIG. 7B) configured to process the electrical signals generated in the radiation absorption layer 110. The electronic system may comprise one or more transistors. For instance, the electronic system may have one or more transistors (e.g., MOSFET (Complementary metal-oxide-semiconductor)). Depending on the type of primary charge carriers responsible for flowing current in the MOSFET, it may be an NMOS (n-channel metal oxide semiconductor field effect transistor) or a PMOS (p-channel metal oxide semiconductor field effect transistor) respectively shown in FIG. 2A and FIG. 2B.

Figure 2A:
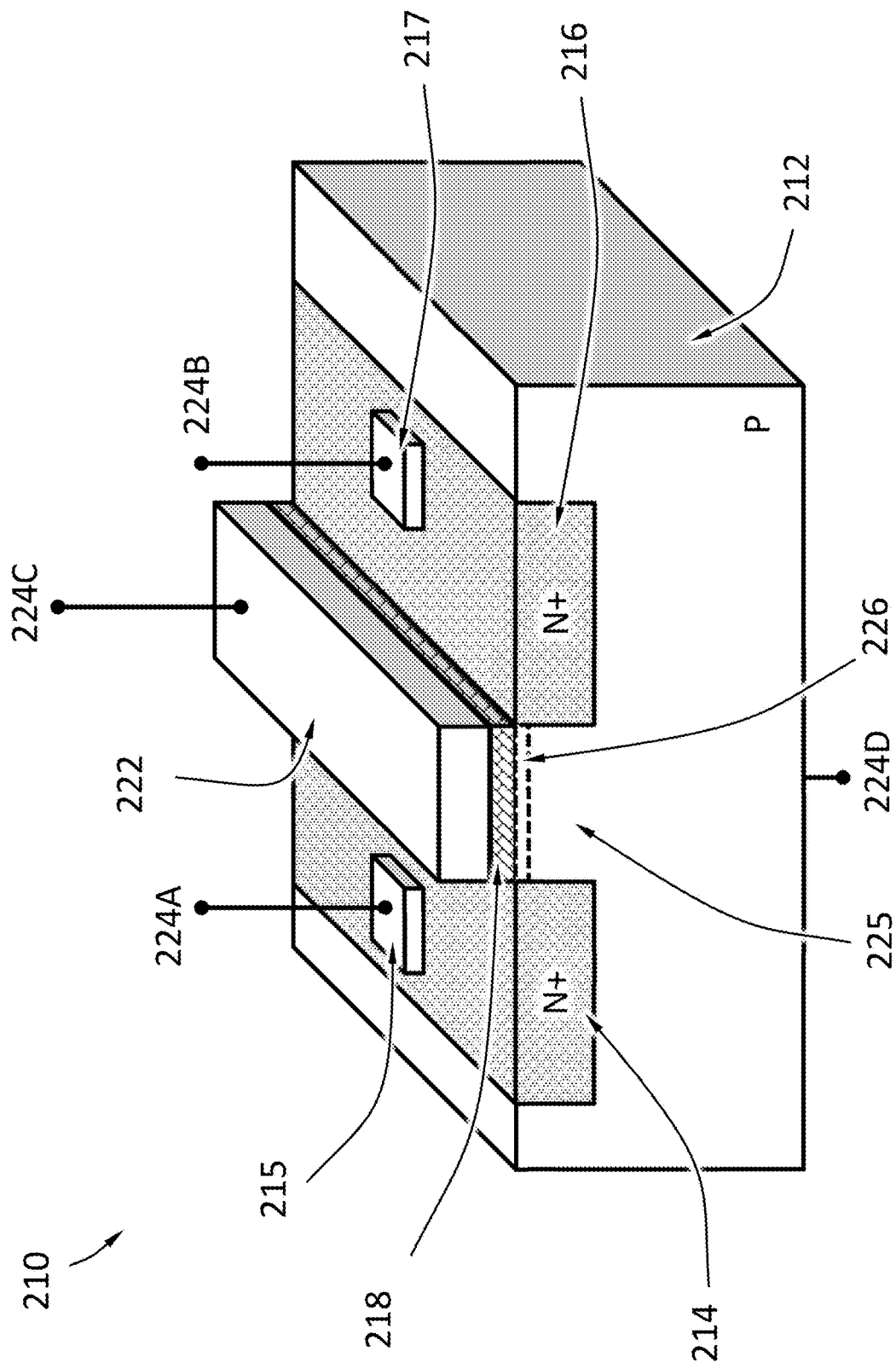
FIG. 2A and FIG. 2B each schematically shows a MOSFET.
Figure 2B:
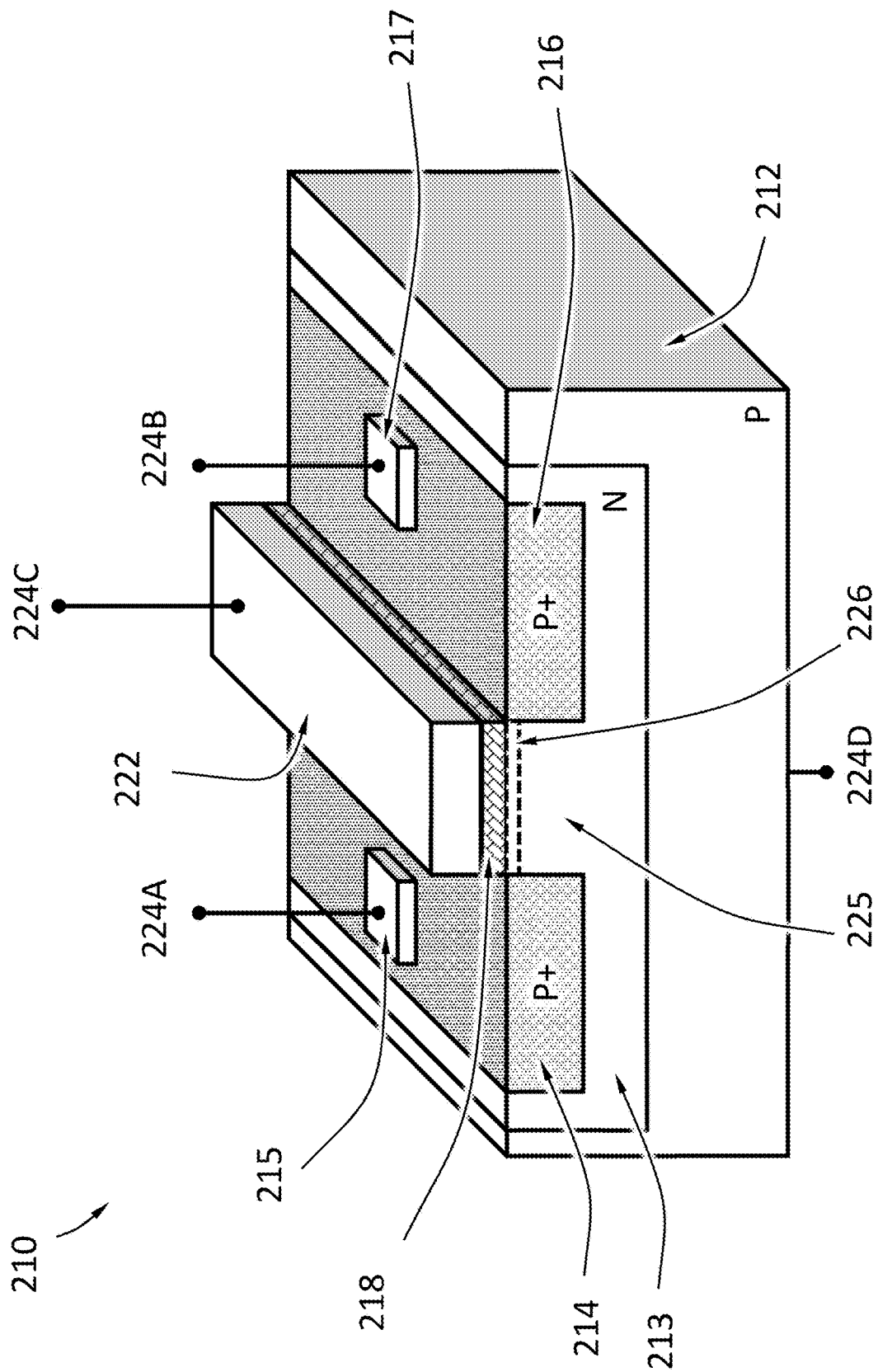

FIG. 2A and FIG. 2B each schematically show a MOSFET 210, where the MOSFET 210 shown in FIG. 2A is a NMOS and the MOSFET 210 shown in FIG. 2B is a PMOS. The MOSFET 210 may comprise a semiconductor substrate 212, a source 214, a drain 216, a gate insulator 218, a source electrode 215 on the source 214, a drain electrode 217 on the drain 216, a gate electrode 222 on the gate insulator 218, and a channel region 225.

The semiconductor substrate 212 may comprise a semiconductor material such as a p-type Si, or any other suitable semiconductor material. The semiconductor substrate 212 may be grounded or connect to the source 214 or a power supply via a bulk terminal 224D during normal operation.

The source 214 and the drain 216 may be regions doped with p or n type dopants, and the channel region 225 may separate the source 214 from the drain 216. In the example of FIG. 2A, the source 214 and the drain 216 are doped regions embedded in the semiconductor substrate 212, having a doping type opposite of the doping type of the semiconductor substrate 212. In the example of FIG. 2A, the source 214 and the drain 216 are heavily doped with n-type dopants, and the semiconductor substrate 212 is p-type. The phrase "heavily doped" is not a term of degree. A heavily doped semiconductor has its electrical conductivity comparable to metals and exhibits essentially linear positive thermal coefficient. In the example of FIG. 2A, the channel region 225 may be part of the semiconductor substrate 212. As shown in FIG. 2B, the PMOS may further comprise a diffusion well 213 embedded in the semiconductor substrate 212, which has a doping type (e.g., n type) opposite of the doping type of the semiconductor substrate 212 (e.g., p type). In the example of FIG. 2B, the source 214 and the drain 216 are doped regions embedded in the diffusion well 213, having a doping type opposite of the doping type of diffusion well 213. In the example of FIG. 2B, the source 214 and the drain 216 are heavily doped with p-type dopants, and the diffusion well 213 and the semiconductor substrate 212 are n-type and p-type respectively. In the example of FIG. 2B, the channel region 225 of the PMOS may be a part of the diffusion well 213. For both NMOS and PMOS, PN junctions are formed between the doped regions (i.e., source 214, drain 216) and the channel region 225, as well as between the doped regions (i.e., source 214, drain 216) and the diffusion well 213 in the case of PMOS or the semiconductor substrate 212 in the case of NMOS. The source 214 and the drain 216 are electrically isolated from each other due to depletion zones of the PN junctions. The source electrode 215 and the drain electrode 217 may comprise conductive material such as metal. The source electrode 215 may connect to a voltage source (e.g., a power supply) or be grounded via a source terminal 224A during normal operation. The drain electrode 217 may connect to a voltage source (e.g., a power supply) or output signals to other electronics (such as another MOSFET, resistor, capacitor, etc. in the electronic system) via a drain terminal 224B during normal operation.

The gate insulator 218 may be a suitable insulator (e.g., $SiO_2$, $Si_3N_4$) sandwiched between the channel region 225 and the gate electrode 222. The gate electrode 222 may comprise polysilicon, or metal (such as aluminum). The gate electrode 222 may be electrically insulated from the channel region 225 by the gate insulator 218. The gate electrode 222 may connect to a voltage source (e.g., a power supply) or receive input signals from other electronics (such as another MOSFET, resistor or capacitor in the electronics system) via a gate terminal 224C during normal operation.

When a gate voltage $V_G$ (i.e., a bias voltage on the gate electrode 222 with respect to the source 214 or the semiconductor substrate 212) is applied onto the gate electrode 222 via the gate terminal 224C, conductive characteristics of the channel region 225 can be changed due to an electrical field in the channel region 225 produced by the gate voltage $V_G$. When the gate voltage $V_G$ reaches a threshold VT of the MOSFET 210 (e.g., VT is positive for NMOS and is negative for PMOS), a sufficiently strong electrical field is produced in the channel region 225 to attract enough primary charge carriers (e.g., electrons for NMOS, holes for PMOS) toward the interface between the channel region 225 and the gate insulator 218, hence forming a conductive channel 226 (i.e., n-channel for NMOS, p-channel for PMOS) between the source 214 and the drain 216. The conductive channel 226 allows current to flow between the source 214 and the drain 216, and the gate voltage $V_G$ can control the current flowing through the conductive channel 226. The gate insulator 218 helps preventing the current in the conductive channel 226 flowing in and out of the gate electrode 222 during normal operation of the MOSFET 210.

FIG. 3A schematically shows a process of hole-accumulation in the gate insulator 218 of the MOSFET 210. Hole-accumulation is a type of radiation damage that can happen to a MOSFET due to radiation-induced charge trapping. When the radiation detector 100 is exposed to radiation particles, a portion of the radiation particles may reach the electronics layer 120 and be absorbed by the gate insulator 218. Pairs of negative and positive charge carriers (e.g., pairs of electrons 10 and holes 20) may be generated in the gate insulator 218 upon absorption of the radiation particles. Some of these electrons 10 and holes 20 may recombine; while the others may escape from the gate insulator 218. The electrons 10, due to their higher mobility than the holes 20, escape from the gate insulator 218 more easily than the holes 20. Some of the holes 20 may be trapped by hole traps 30 (e.g., lattice defects) and accumulate in the gate insulator 218 After a period of time (e.g., weeks, months, etc.) of exposure to radiation, hole-accumulation in the gate insulator 218 may qualitatively deteriorate the performance of the MOSFET 210. For instance, the accumulated holes 20 in the gate insulator 218 may create a persistent gate biasing that causes a shift in the threshold voltage VT. The gate biasing may make the MOSFET 210 easier to switch on if the MOSFET 210 is a NMOS, and may make the MOSFET 210 harder to switch on if the MOSFET 210 is a PMOS. Some self-healing processes may occur in the gate insulator 218 over time, but the effect of self-healing may not be significant enough to overcome the overall performance loss of the MOSFET 210 due to hole-accumulation.

Figure 3B:
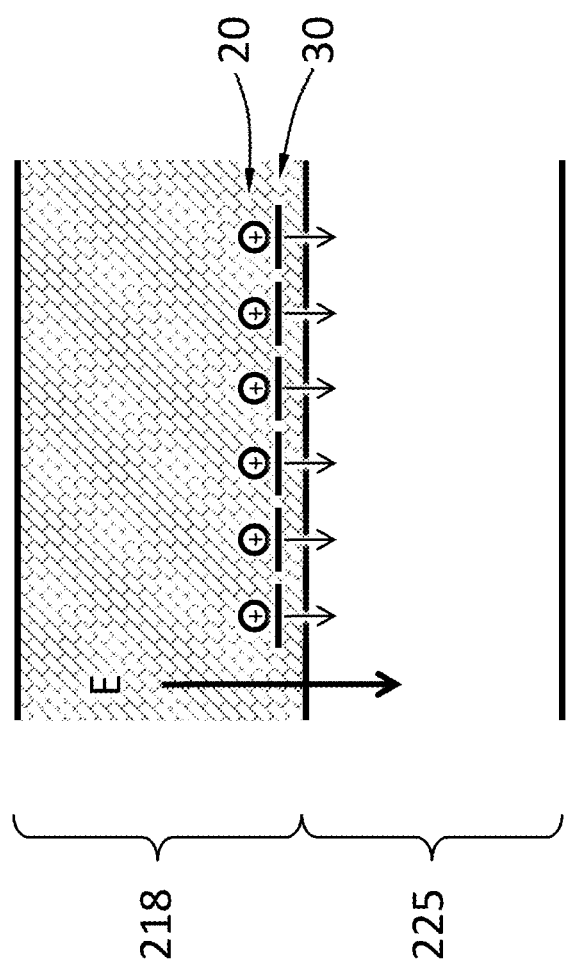
FIG. 3B and FIG. 3C each schematically show recovering the MOSFET from performance loss due to hole-accumulation, according to an embodiment.

FIG. 3B schematically shows recovering the MOSFET 210 from performance loss due to hole-accumulation, by tunneling, according to an embodiment. An electrical field E may be applied across the gate insulator 218. When the electrical field E is strong enough, trapped holes 20 may escape from the hole traps 30 by overcoming an energy barrier of the hole traps 30 and eventually drift into the channel region 225. Overtime, the holes 20 accumulated in the gate insulator 218 may be mostly (e.g., 80%, 90%, 99%, etc.) removed from the gate insulator 218.

Figure 3C:
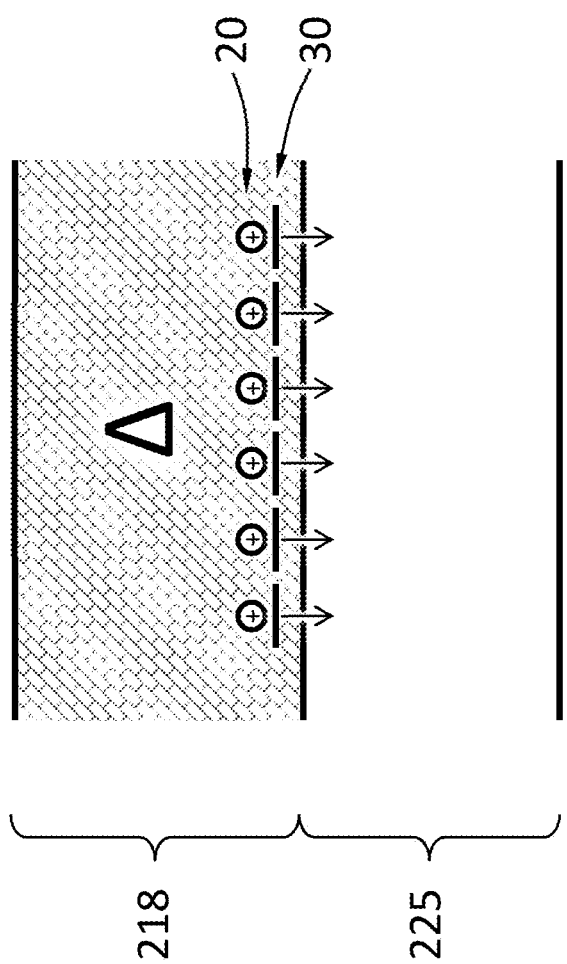

FIG. 3C schematically shows recovering the MOSFET 210 from performance loss due to hole-accumulation, by thermal excitation, according to an embodiment. The gate insulator 218 may be annealed at an elevated temperature (e.g., 100° C., 200° C. or above). The trapped holes 20 may have sufficient thermal energy to escape from the hole traps 30 by overcoming an energy barrier of the hole traps 30 and eventually drift into the channel region 225. Overtime, the holes 20 accumulated in the gate insulator 218 may be mostly (e.g., 80%, 90%, 99%, etc.) removed from the gate insulator 218.

Figure 4A:
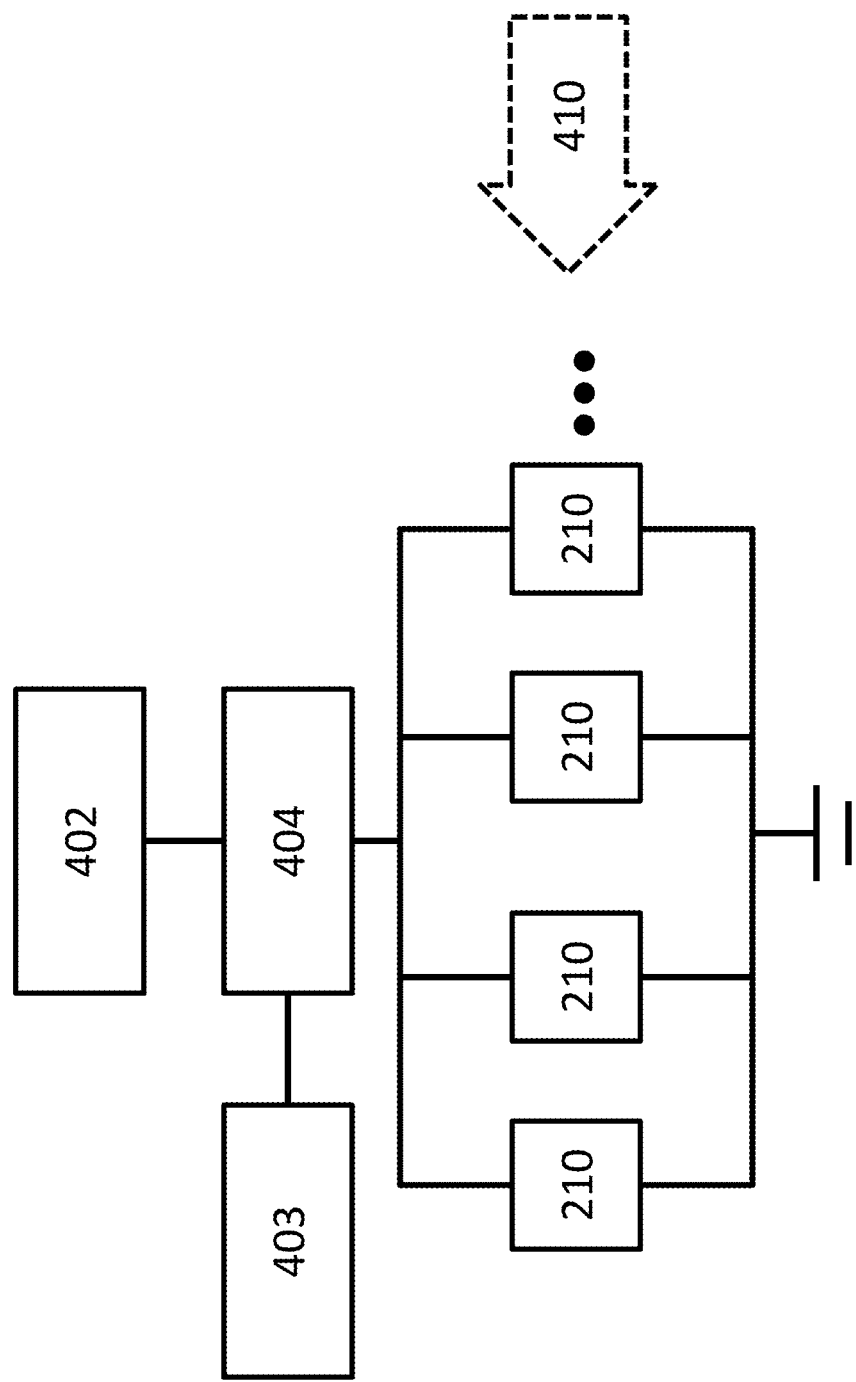
FIG. 4A and FIG. 4B schematically show recovering the performance of the radiation detector 100, according to an embodiment.
Figure 4B:
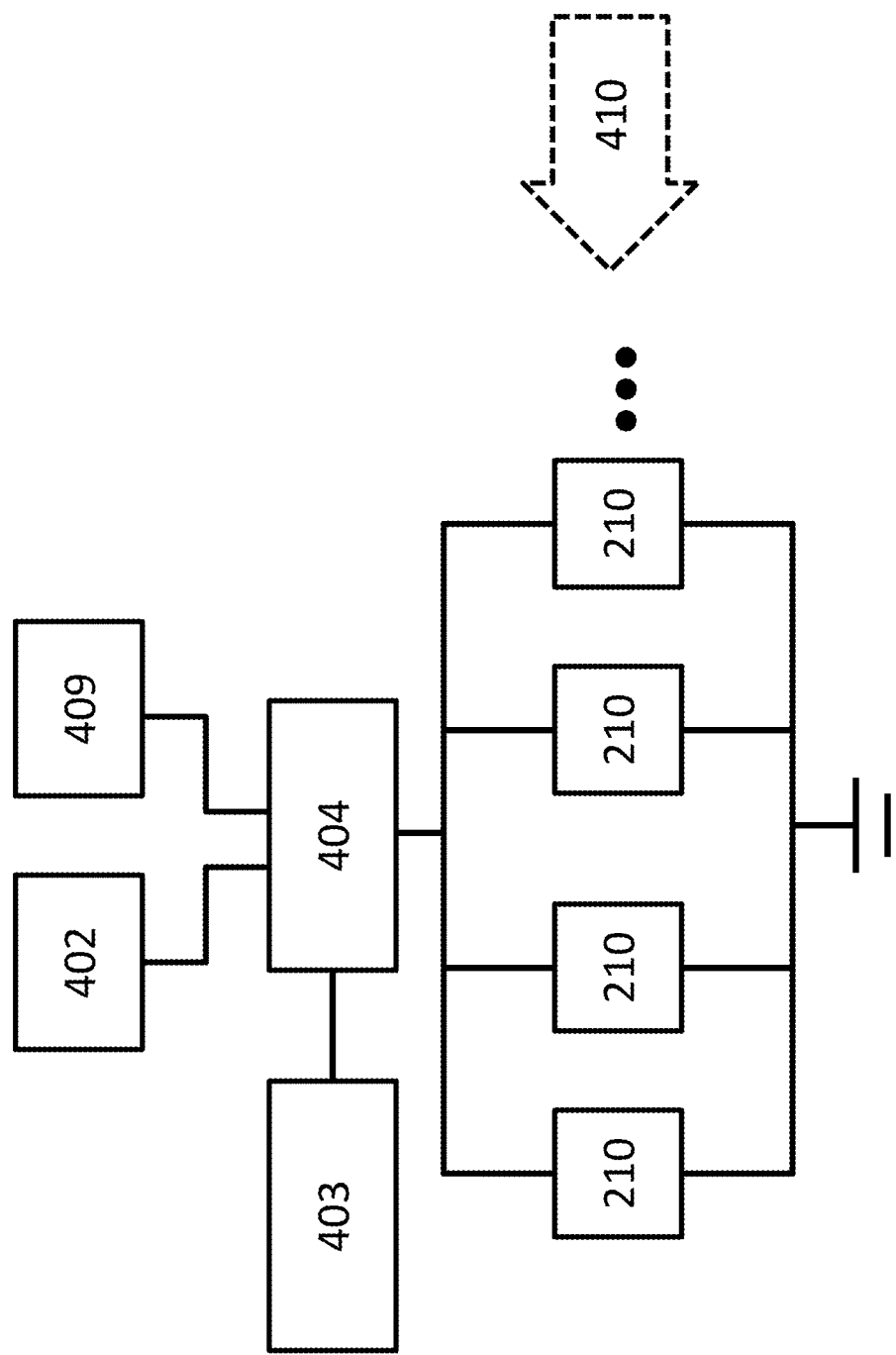

FIG. 4A and FIG. 4B schematically show recovering the performance of the radiation detector 100, according to an embodiment. The electronics layer 120 of the radiation detector 100 may comprise one MOSFET 210 (or multiple MOSFETs 210 as shown in FIG. 4A and FIG. 4B) with radiation induced hole-accumulation (as shown in FIG. 3A) within its gate insulator 218. Removing the holes in the gate insulators 218 may be done by establishing an electric field across the gate insulators 218 (i.e., the tunneling mechanism shown in FIG. 3B). In an embodiment, establishing an electric field across the gate insulator 218 may be achieved by applying a bias voltages $V_{G,R}$ (e.g., provided by a voltage source 402 in FIG. 4A and FIG. 4B) on the gate electrode 222 of the MOSFET 210. The bias voltages $V_{G,R}$ may be with respect to the source 214, the drain 216 or the semiconductor substrate 212 of the MOSFET 210. For instance, the source 214, the drain 216 or the semiconductor substrate 212 of the MOSFET 210 each may connect to another voltage source (with an electrical potential different from the bias voltage $V_{G,R}$) or may be grounded. In an embodiment, the source 214 and the drain 216 the MOSFET 210 may be at the same electrical potential. In the example of FIG. 4A and FIG. 4B, the sources 214, the drains 216 and the semiconductor substrates 212 of the MOSFET 210 are all grounded. The bias voltage $V_{G,R}$ may have a magnitude sufficient to remove the holes 20 accumulated in the gate insulator 218 from the gate insulator 218. For instance, the bias voltages $V_{G,R}$ may have a magnitude below a breakdown voltage of the gate insulator 218 and above a percentage (e.g., >90%) of the breakdown voltage of the gate insulator 218. In other words, by applying the bias voltages $V_{G,R}$ to the gate electrode 222 of the MOSFET 210, the electrical field is established across the gate insulator 218, and the electrical field is strong enough to remove most of the holes (e.g., 80%, 90%, 99%, etc.) accumulated in the gate insulator 218 from the gate insulator 218 within a certain time period (e.g., an hour, a day).

The radiation detector 100 may comprise a switch 404 and a processor 403. The switch 404 may be configured to connect the gate electrode 222 with the voltage source 402 under the control of the processor 403, e.g., via the gate terminal 224C. The processor 403 may be configured to receive a code (e.g., a key code, a password), determine the validity of the code, and apply the bias voltages $V_{G,R}$ to the gate electrode 222 only after validity of the code is determined. Each copy of the radiation detector 100 may have a unique code. Only when a valid code corresponding to a particular copy of the radiation detector 100 is provided to the processor 403, the processor 403 would apply the bias voltage $V_{G,R}$ (e.g., using the switch 404) to the gate electrode 222. For example, the switch 404 may be a reconfigurable switch network, and the processor 403 may reconfigure the switch network based on the code. Only when the code provided to the processor 403 is valid, the processor 403 reconfigures the switch network so that the bias voltage $V_{G,R}$ is applied to the gate electrode 222 from the voltage source 402.

In an embodiment shown in FIG. 4A, the bias voltage $V_{G,R}$ and the gate voltage $V_G$ may both be provided by the voltage source 402, as shown in the example of FIG. 4A. The voltage source 402 may be adjustable so that the magnitude and the sign of the bias voltage $V_{G,R}$ may be tuned, for example between the bias voltage $V_{G,R}$ and the gate voltage $V_G$. The bias voltage $V_{G,R}$ applied to the gate electrode 222 in different MOSFET 210 may be different.

In an embodiment shown in FIG. 4B, the bias voltage $V_{G,R}$ may be provided by the voltage source 402, and the gate voltage $V_G$ may be provided by another voltage source 409. The voltage source 402 and the voltage source 409 may not be adjustable. The switch 404 may be configured to apply to the gate electrode 222 the voltage from the voltage source 402 or the voltage from the voltage source 409.

In an embodiment, the radiation detector 100 may further comprise a heating element 410 configured to anneal the gate insulator 218, e.g., by heating the electronics layer 120 to an elevated temperature in the recovery mode. The elevated temperature may be higher than an ambient temperature for normal operation of the radiation detector 100. For instance, the elevated temperature may be 100° C., 200° C. and above. The holes accumulated in the gate insulator 218 of the MOSFET 210 may be removed from the gate insulator 218 by thermal excitation (as shown in FIG. 3C).

Figure 5A:
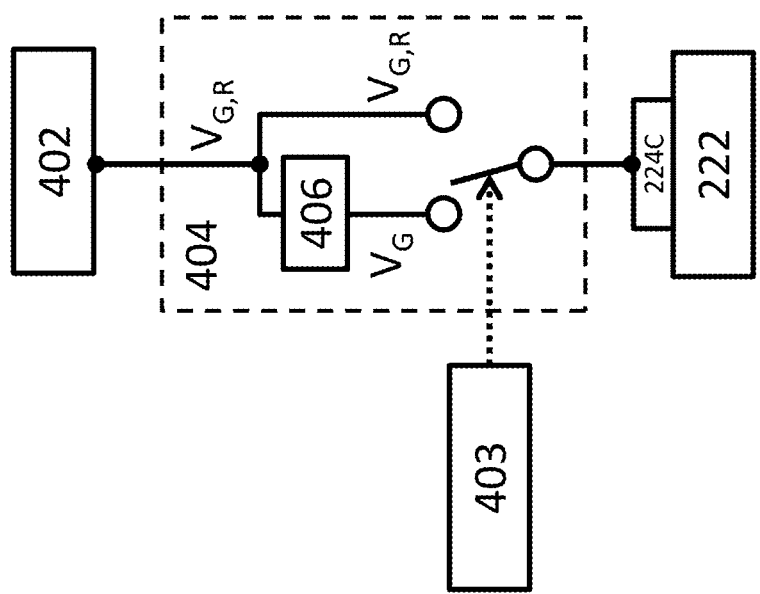
FIG. 5A and FIG. 5B each schematically show a functional block diagram of the switch 404, according to an embodiment.

FIG. 5A schematically shows a functional block diagram of the switch 404, according to an embodiment. The switch 404 may have a limiter 406. The limiter 406 is a circuit configured to allow a voltage with a magnitude below a threshold to pass unaffected and attenuate a voltage with a magnitude above the threshold to a voltage with a magnitude below or equal to the threshold. The threshold may be chosen such that if a bias voltage applied to the to the gate electrode 222 has a magnitude below the threshold, the bias voltage is insufficient to remove the accumulated holes from the gate insulator 318. The voltage source 402 may supply a voltage $V_{G,R}$ sufficient to remove the accumulated holes from the gate insulator. During normal operation of the radiation detector 100, the processor 403 causes the switch 404 to direct the voltage $V_{G,R}$ across the limiter 406, thereby limiting $V_{G,R}$ to $V_G$ and applying $V_G$ to the gate electrode 222. During recovery of the radiation detector 100, e.g., when a valid code is provided, the processor 403 causes the switch 404 to apply the voltage $V_{G,R}$ to the gate electrode 222, without limiting it by the limiter 406.

Figure 5B:
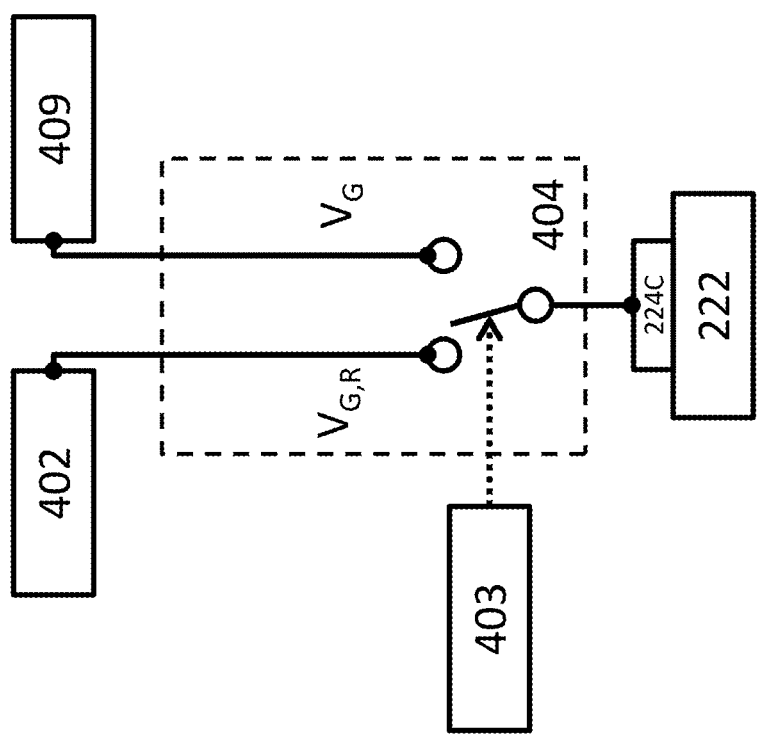

FIG. 5B schematically shows a functional block diagram of the switch 404, according to an embodiment. The voltage source 402 may supply a voltage $V_{G,R}$ sufficient to remove the accumulated holes from the gate insulator. During normal operation of the radiation detector 100, the processor 403 causes the switch 404 to apply the voltage $V_G$ from the voltage source 409 to the gate electrode 222. During recovery of the radiation detector 100, e.g., when a valid code is provided, the processor 403 causes the switch 404 to apply the voltage $V_{G,R}$ from the voltage source 402 to the gate electrode 222.

Figure 6A:
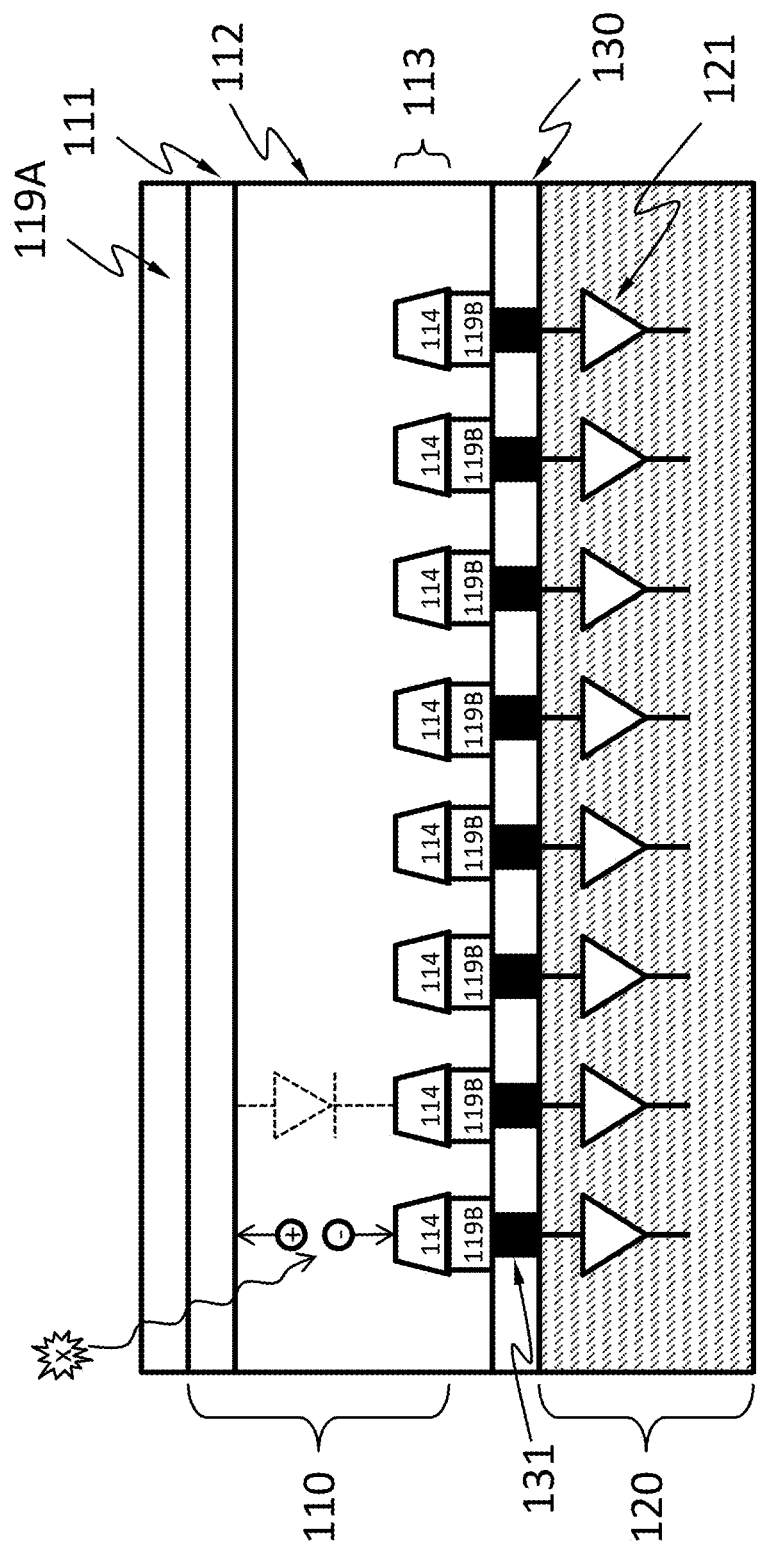
FIG. 6A schematically shows a detailed cross-sectional view of the radiation detector, according to an embodiment.

FIG. 6A schematically shows a detailed cross-sectional view of the radiation detector 100, according to an embodiment, the radiation absorption layer 110 may include one or more diodes (e.g., p-i-n or p-n) formed by a first doped region 111, one or more discrete regions 114 of a second doped region 113. The second doped region 113 may be separated from the first doped region 111 by an optional the intrinsic region 112. The discrete regions 114 are separated from one another by the first doped region 111 or the intrinsic region 112. The first doped region 111 and the second doped region 113 have opposite types of doping (e.g., region 111 is p-type and region 113 is n-type, or region 111 is n-type and region 113 is p-type). In the example in FIG. 6A, each of the discrete regions 114 of the second doped region 113 forms a diode with the first doped region 111 and the optional intrinsic region 112. Namely, in the example in FIG. 6A, the radiation absorption layer 110 has a plurality of diodes having the first doped region 111 as a shared electrode. The first doped region 111 may also have discrete portions.

When radiation from the radiation source hits the radiation absorption layer 110 including diodes, the radiation photon may be absorbed and generate one or more charge carriers by a number of mechanisms. The charge carriers may drift to the electrodes of one of the diodes under an electric field. The field may be an external electric field. The electrical contact 119B may include discrete portions each of which is in electrical contact with the discrete regions 114. The term "electrical contact" may be used interchangeably with the word "electrode." In an embodiment, the charge carriers may drift in directions such that the charge carriers generated by a single particle of the radiation are not substantially shared by two different discrete regions 114 ("not substantially shared" here means less than 2%, less than 0.5%, less than 0.1%, or less than 0.01% of these charge carriers flow to a different one of the discrete regions 114 than the rest of the charge carriers). Charge carriers generated by a particle of the radiation incident around the footprint of one of these discrete regions 114 are not substantially shared with another of these discrete regions 114. The radiation detector 100 may comprise an array of pixels, and each pixel in the array may associate with a discrete region 114. A pixel in the array may be an area around the discrete region 114 the pixel associated with, in which substantially all (more than 98%, more than 99.5%, more than 99.9%, or more than 99.99% of) charge carriers generated by a particle of the radiation incident therein flow to the discrete region 114. Namely, less than 2%, less than 1%, less than 0.1%, or less than 0.01% of these charge carriers flow beyond the pixel.

Figure 6B:
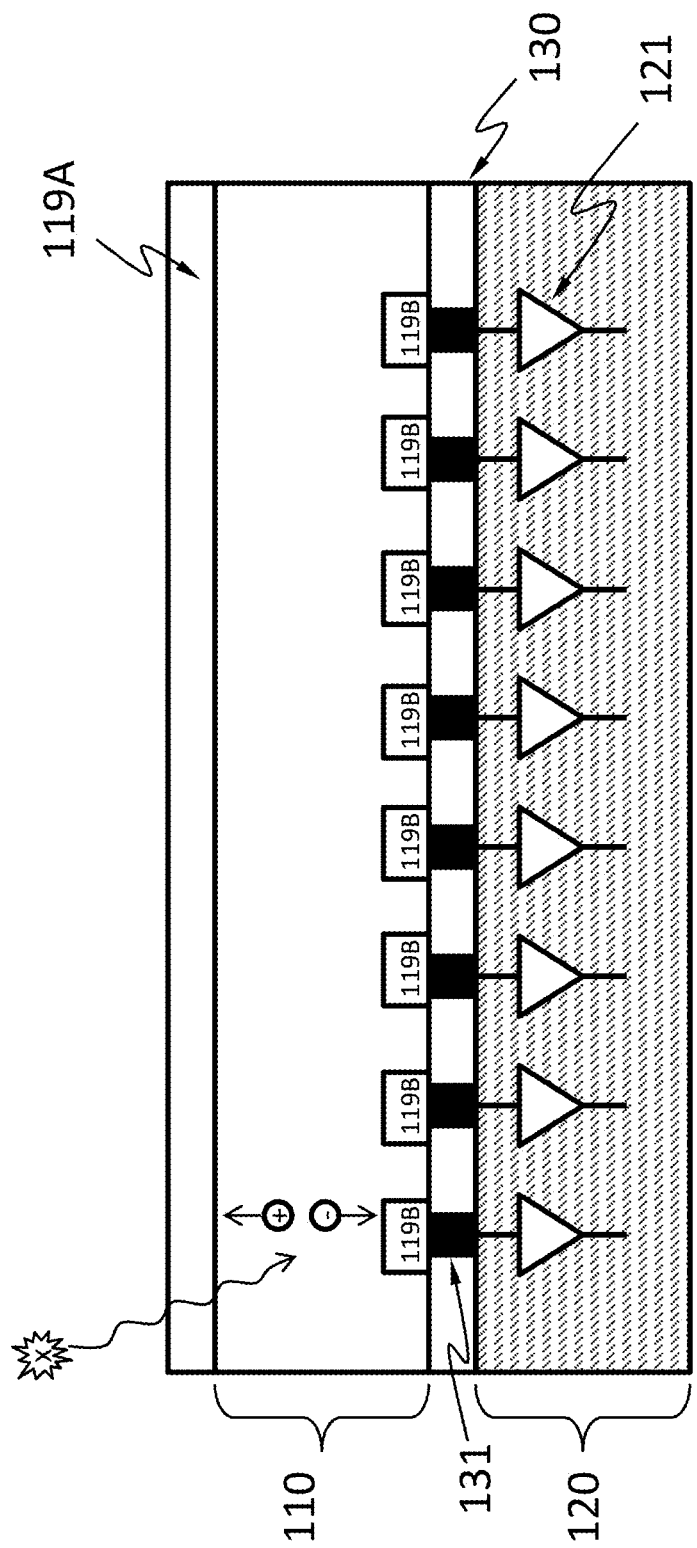
FIG. 6B schematically shows an alternative detailed cross-sectional view of the radiation detector, according to an embodiment.

As shown in an alternative detailed cross-sectional view of the radiation detector 100 in FIG. 6B, according to an embodiment, the radiation absorption layer 110 may include a resistor of a semiconductor material such as, silicon, germanium, GaAs, CdTe, CdZnTe, or a combination thereof, but does not include a diode. The semiconductor may have a high mass attenuation coefficient for the radiation of interest.

When the radiation hits the radiation absorption layer 110 including a resistor but not diodes, it may be absorbed and generate one or more charge carriers by a number of mechanisms. A particle of the radiation may generate 10 to 100000 charge carriers. The charge carriers may drift to the electrical contacts 119A and 119B under an electric field. The field may be an external electric field. The electrical contact 119B includes discrete portions. In an embodiment, the charge carriers may drift in directions such that the charge carriers generated by a single particle of the radiation are not substantially shared by two different discrete portions of the electrical contact 119B ("not substantially shared" here means less than 2%, less than 0.5%, less than 0.1%, or less than 0.01% of these charge carriers flow to a different one of the discrete portions than the rest of the charge carriers). Charge carriers generated by a particle of the radiation incident around the footprint of one of these discrete portions of the electrical contact 119B are not substantially shared with another of these discrete portions of the electrical contact 119B. A pixel in the array associated with a discrete portion of the electrical contact 119B may be an area around the discrete portion in which substantially all (more than 98%, more than 99.5%, more than 99.9% or more than 99.99% of) charge carriers generated by a particle of the radiation incident therein flow to the discrete portion of the electrical contact 119B. Namely, less than 2%, less than 0.5%, less than 0.1%, or less than 0.01% of these charge carriers flow beyond the pixel associated with the one discrete portion of the electrical contact 119B.

The electronics layer 120 may include an electronic system 121 suitable for processing or interpreting signals generated by the radiation incident on the radiation absorption layer 110. The electronic system 121 may include an analog circuitry such as a filter network, amplifiers, integrators, and comparators, or a digital circuitry such as a microprocessor, and memory. The electronic system 121 may include one or more ADCs. The electronic system 121 may include components shared by the pixels or components dedicated to a single pixel. For example, the electronic system 121 may include an amplifier dedicated to each pixel and a microprocessor shared among all the pixels. The electronic system 121 may be electrically connected to the pixels by vias 131. Space among the vias may be filled with a filler material 130, which may increase the mechanical stability of the connection of the electronics layer 120 to the radiation absorption layer 110. Other bonding techniques are possible to connect the electronic system 121 to the pixels without using vias.

Figure 7A:
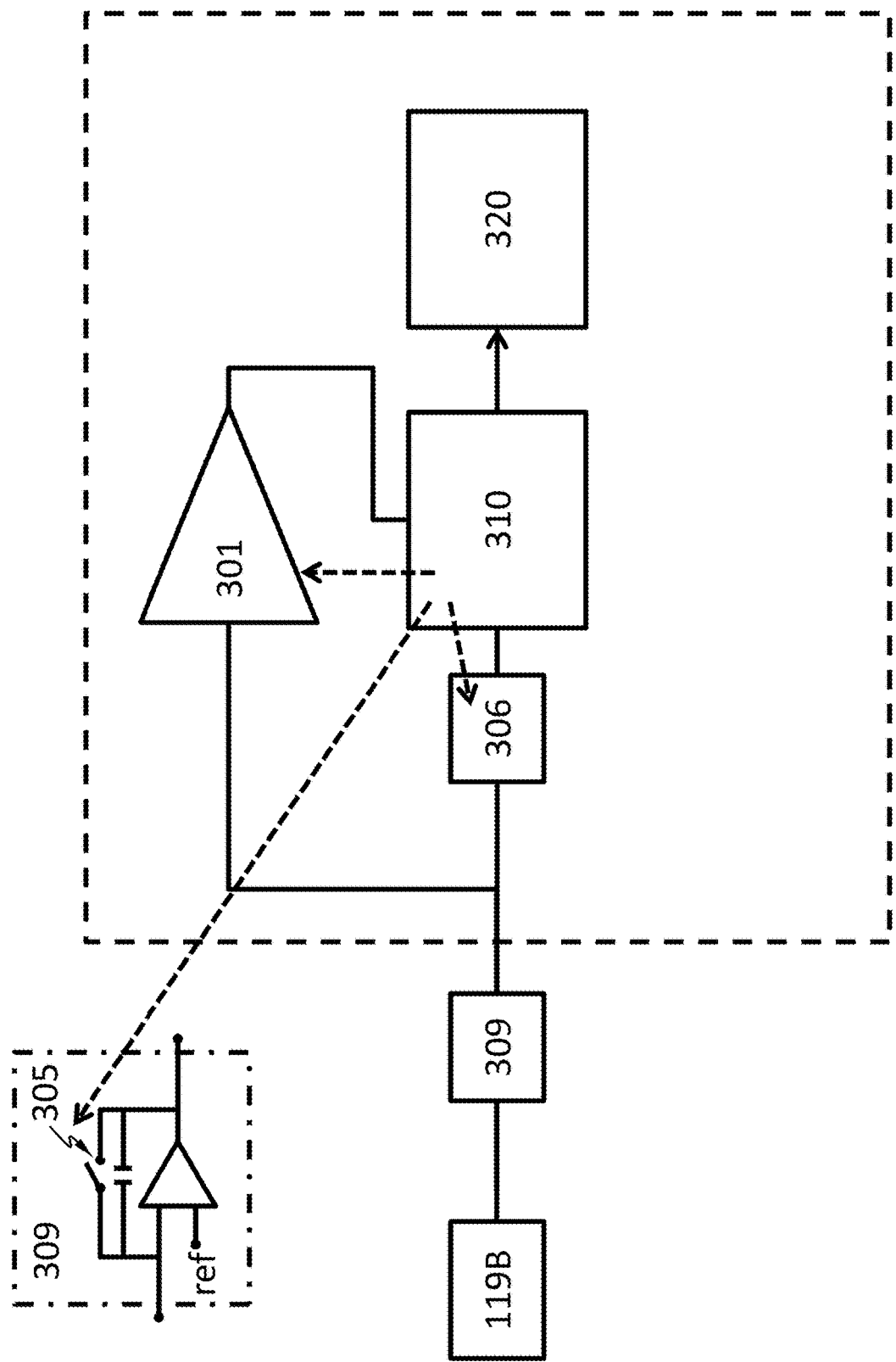
FIG. 7A and FIG. 7B each show a component diagram of the electronic system, according to an embodiment.
Figure 7B:
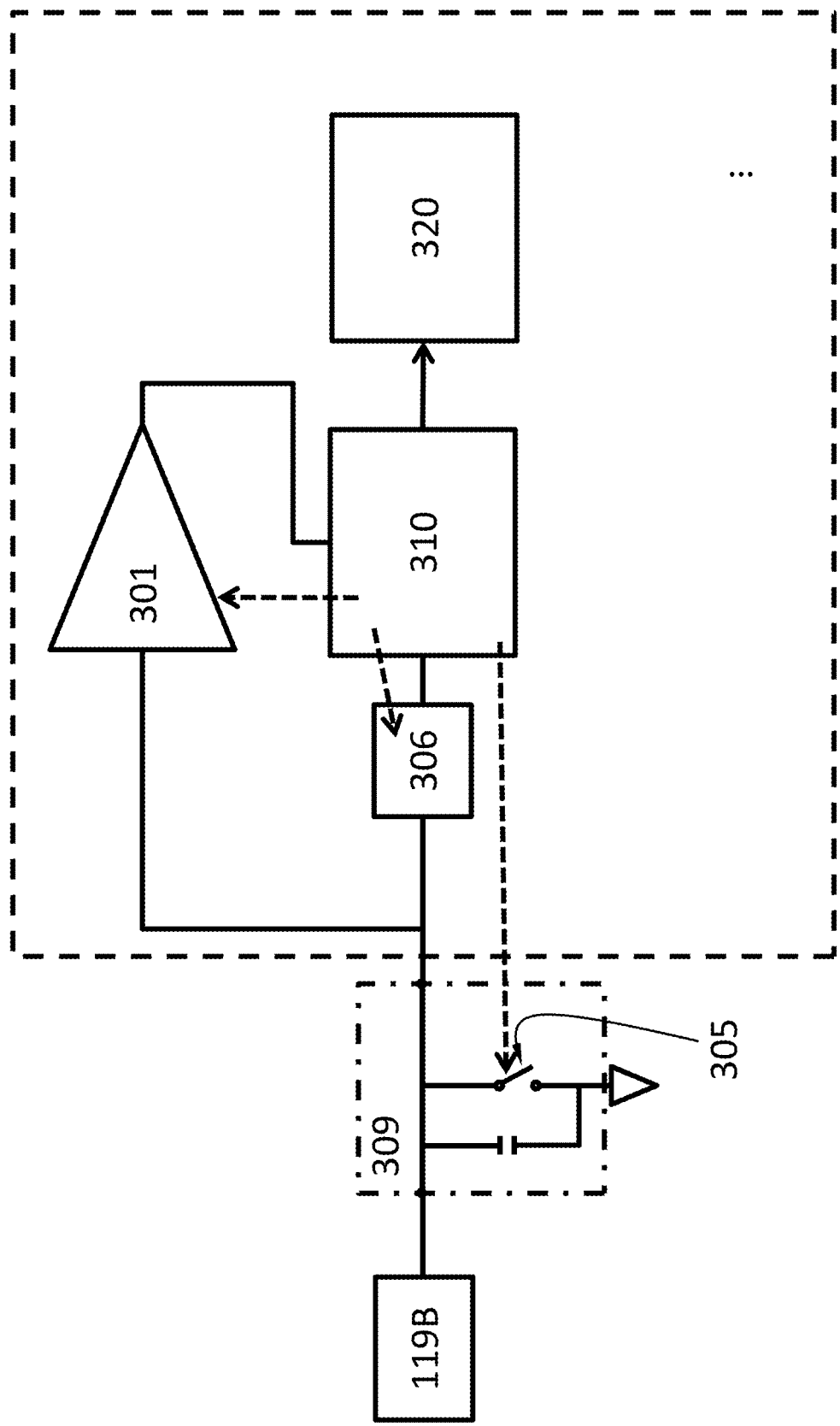

FIG. 7A and FIG. 7B each show a component diagram of the electronic system 121, according to an embodiment. The electronic system 121 may include a voltage comparator 301, a counter 320, a switch 305, a voltmeter 306 and a controller 310.

The voltage comparator 301 is configured to compare the voltage of the electrode of a diode to a first threshold. The diode may be a diode formed by the first doped region 111, one of the discrete regions 114 of the second doped region 113, and the optional intrinsic region 112. Alternatively, the voltage comparator 301 is configured to compare the voltage of an electrical contact (e.g., a discrete portion of electrical contact 119B) to a first threshold. The voltage comparator 301 may be configured to monitor the voltage directly, or calculate the voltage by integrating an electric current flowing through the diode or electrical contact over a period of time. The voltage comparator 301 may be controllably activated or deactivated by the controller 310. The voltage comparator 301 may be a continuous comparator. Namely, the voltage comparator 301 may be configured to be activated continuously, and monitor the voltage continuously. The voltage comparator 301 configured as a continuous comparator reduces the chance that the system 121 misses signals generated by an incident photon. The voltage comparator 301 configured as a continuous comparator is especially suitable when the incident radiation intensity is relatively high. The voltage comparator 301 may be a clocked comparator, which has the benefit of lower power consumption. The voltage comparator 301 configured as a clocked comparator may cause the system 121 to miss signals generated by some incident photons. When the incident radiation intensity is low, the chance of missing an incident photon is low because the time interval between two successive photons is relatively long. Therefore, the voltage comparator 301 configured as a clocked comparator is especially suitable when the incident radiation intensity is relatively low. The first threshold may be 5-10%, 10%-20%, 20-30%, 30-40% or 40-50% of the voltage a single photon may generate on the electrode of the diode or the electrical contact of the resistor. The maximum voltage may depend on the energy of the incident photon, the material of the radiation absorption layer 110, and other factors. For example, the first threshold may be 50 mV, 100 mV, 150 mV, or 200 mV.

The voltage comparator 301 may include one or more op-amps or any other suitable circuitry. The voltage comparator 301 may have a high speed to allow the system 121 to operate under a high flux of incident radiation. However, having a high speed is often at the cost of power consumption.

The counter 320 is configured to register a number of photons reaching the diode or resistor. The counter 320 may be a software component (e.g., a number stored in a computer memory) or a hardware component (e.g., a 4017 IC and a 7490 IC).

The controller 310 may be a hardware component such as a microcontroller and a microprocessor. The controller 310 is configured to start a time delay from a time at which the voltage comparator 301 determines that the absolute value of the voltage equals or exceeds the absolute value of the first threshold (e.g., the absolute value of the voltage increases from below the absolute value of the first threshold to a value equal to or above the absolute value of the first threshold). The absolute value is used here because the voltage may be negative or positive, depending on whether the voltage of the cathode or the anode of the diode or which electrical contact is used. The controller 310 may be configured to keep deactivated the counter 320 and any other circuits the operation of the voltage comparator 301 does not require, before the time at which the voltage comparator 301 determines that the absolute value of the voltage equals or exceeds the absolute value of the first threshold. The time delay may expire before or after the voltage becomes stable, i.e., the rate of change of the voltage is substantially zero. The phase "the rate of change of the voltage is substantially zero" means that temporal change of the voltage is less than 0.1%/ns. The phase "the rate of change of the voltage is substantially non-zero" means that temporal change of the voltage is at least 0.1%/ns.

The term "activate" means causing the component to enter an operational state (e.g., by sending a signal such as a voltage pulse or a logic level, by providing power, etc.). The term "deactivate" means causing the component to enter a non-operational state (e.g., by sending a signal such as a voltage pulse or a logic level, by cut off power, etc.). The operational state may have higher power consumption (e.g., 10 times higher, 100 times higher, 1000 times higher) than the non-operational state. The controller 310 itself may be deactivated until the output of the voltage comparator 301 activates the controller 310 when the absolute value of the voltage equals or exceeds the absolute value of the first threshold.

The controller 310 may be configured to cause the voltmeter 306 to measure the voltage upon expiration of the time delay. The controller 310 may be configured to connect the electrode or the electrical contact to an electrical ground, so as to reset the voltage and discharge any charge carriers accumulated on the electrode or the electrical contact. In an embodiment, the electrode or the electrical contact is connected to an electrical ground after the expiration of the time delay. In an embodiment, the electrode or the electrical contact is connected to an electrical ground for a finite reset time period. The controller 310 may connect the electrode or the electrical contact to the electrical ground by controlling the switch 305. The switch may be a transistor such as a field-effect transistor (FET).

In an embodiment, the system 121 has no analog filter network (e.g., a RC network). In an embodiment, the system 121 has no analog circuitry.

The voltmeter 306 may feed the voltage it measures to the controller 310 as an analog or digital signal.

Figure 8:
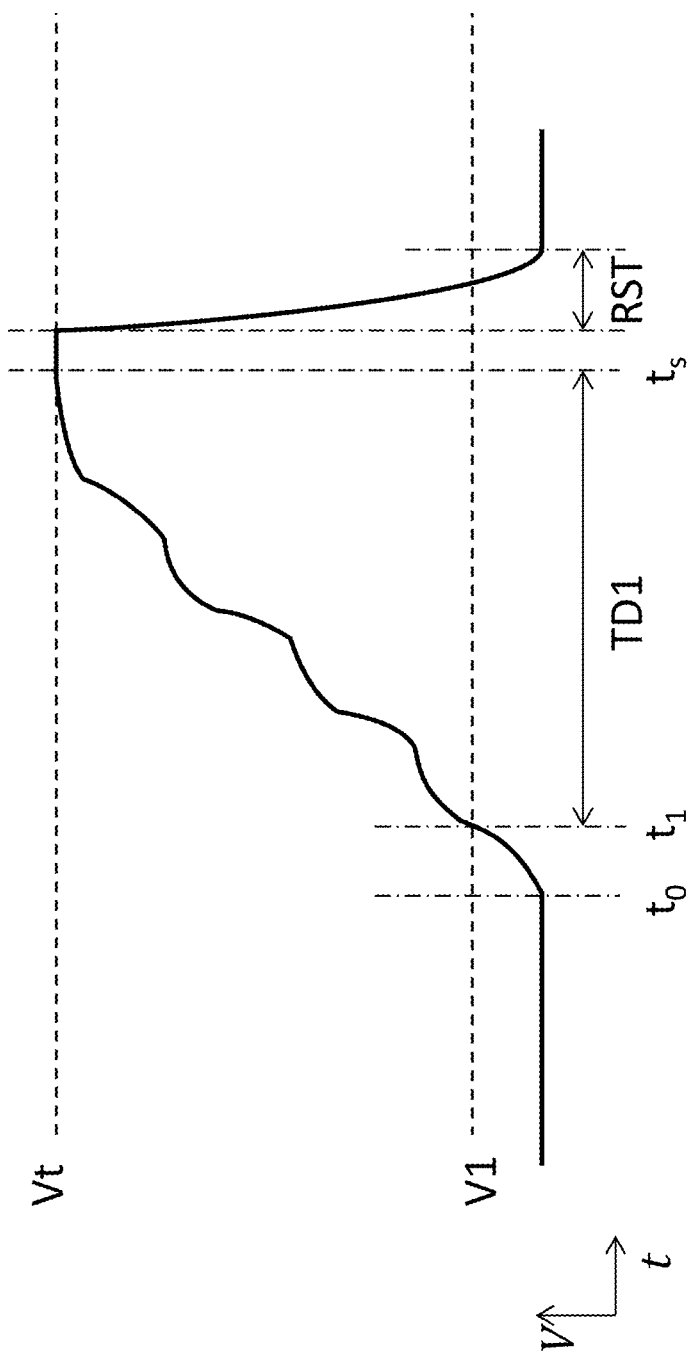
FIG. 8 schematically shows a temporal change of the voltage of the electrode or the electrical contact, caused by charge carriers generated by one or more photons incident on the diode or the resistor, according to an embodiment.

The system 121 may include a capacitor module 309 electrically connected to the electrode of the diode or the electrical contact, wherein the capacitor module is configured to collect charge carriers from the electrode or the electrical contact). The capacitor module can include a capacitor in the feedback path of an amplifier. The amplifier configured as such is called a capacitive transimpedance amplifier (CTIA). CTIA has high dynamic range by keeping the amplifier from saturating and improves the signal-to-noise ratio by limiting the bandwidth in the signal path. Charge carriers from the electrode or the electrical contact accumulate on the capacitor over a period of time ("integration period") (e.g., as shown in FIG. 8, between $t_0$ to $t_1$). After the integration period has expired, the capacitor voltage is sampled and then reset by a reset switch. The capacitor module can include a capacitor directly connected to the electrode or the electrical contact.

FIG. 8 schematically shows a temporal change of the voltage of the electrode or the electrical contact, caused by charge carriers generated by one or more photons incident on the diode or the resistor, according to an embodiment. The voltage may be an integral of the electric current with respect to time. One or more photons hit the diode or the resistor starting at time to, charge carriers start being generated in the diode or the resistor, electric current starts to flow through the electrode of the diode or the electrical contact of the resistor, and the absolute value of the voltage of the electrode or the electrical contact starts to increase. At time $t_1$, the voltage comparator 301 determines that the absolute value of the voltage equals or exceeds the absolute value of the first threshold V1, and the controller 310 starts the time delay TD1 and the controller 310 may deactivate the voltage comparator 301 at the beginning of TD1. If the controller 310 is deactivated before $t_1$, the controller 310 is activated at $t_1$. At time $t_s$, the time delay TD1 expires. The photons may continue hit the diode or the resistor throughout the entirety of TD1.

The controller 310 may be configured to cause the voltmeter 306 to measure the voltage upon expiration of the time delay TD1. The voltage Vt measured by the voltmeter 306 is proportional to the amount of charge carriers generated by the incident photons from $t_0$ to $t_s$, which relates to the total energy of the incident photons. When the incident photons have similar energy, the controller 310 may be configured to determine the number of incident photons from $t_0$ to $t_s$, by dividing Vt with the voltage that a single photon would cause on the electrode or electrical contact. The controller 310 may increase the counter 320 by the number of photons.

After TD1 expires, the controller 310 connects the electrode or the electrical contact to an electric ground for a reset period RST to allow charge carriers accumulated on the electrode or the electrical contact to flow to the ground and reset the voltage. After RST, the system 121 is ready to detect another incident photon. If the voltage comparator 301 has been deactivated, the controller 310 can activate it at any time before RST expires. If the controller 310 has been deactivated, it may be activated before RST expires.

In an embodiment, one or more components of the electronic system 121 (e.g., the controller 310, the voltage comparator 301, the counter 320, etc.) may comprise one or more MOSFETs 210 that may be subject to radiation damage over time. The performance of the one or more MOSFETs 210 may be recovered using the methods describe here.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method of recovering performance of a radiation detector,
    the radiation detector comprising:
        a radiation absorption layer configured to absorb radiation particles incident thereon and generate an electrical signal based on the radiation particles;
        an electronic system configured to process the electrical signal, the electronic system comprising a transistor, the transistor comprising a gate insulator with positive charge carriers accumulated therein due to exposure of the gate insulator to radiation;
    the method comprising:
        removing the positive charge carriers from the gate insulator by establishing an electric field across the gate insulator.

2. The method of claim 1, wherein removing the positive charge carriers comprises annealing the gate insulator.

3. The method of claim 1, further comprising:
    receiving a code;
    determining whether the code is valid;
    wherein the positive charge carriers are removed from the gate insulator only when the code is valid.

4. The method of claim 1, wherein the transistor comprises a gate electrode; wherein establishing the electric field comprises applying a bias voltage on the gate electrode.

5. The method of claim 4, wherein applying the bias voltage on the gate electrode comprises connecting the gate electrode to a voltage source.

6. The method of claim 4, wherein applying the bias voltage on the gate electrode comprises limiting the bias voltage by a limiter.

7. The method of claim 4, wherein the transistor comprises a source and a drain; wherein the bias voltage on the gate electrode is with respect to the source or the drain.

8. The method of claim 7, wherein the source and the drain are at a same electrical potential.

9. The method of claim 4, wherein the bias voltage has a magnitude below a breakdown voltage of the gate insulator.

10. The method of claim 4, wherein the bias voltage has a magnitude greater than 90% of a breakdown voltage of the gate insulator.

11. The method of claim 1, wherein the transistor is a MOSFET.

12. The method of claim 1, wherein the electronic system comprises:

a voltage comparator configured to compare a voltage of an electrical contact of the radiation absorption layer to a first threshold;

a counter configured to register a number of radiation particles absorbed by the radiation absorption layer;

a controller;

a voltmeter;

wherein the controller is configured to start a time delay from a time at which the voltage comparator determines that an absolute value of the voltage equals or exceeds an absolute value of the first threshold;

wherein the controller is configured to cause the voltmeter to measure the voltage upon expiration of the time delay;

wherein the controller is configured to determine a number of radiation particles by dividing the voltage measured by the voltmeter by a voltage that a single radiation particle would have caused on the electrical contact of the radiation absorption layer;

wherein the controller is configured to cause the number registered by the counter to increase by the number of radiation particles.

13. The method of claim 12, wherein the controller comprises the transistor.

14. The method of claim 12, wherein the voltage comparator comprises the transistor.

15. The method of claim 12, wherein the radiation detector further comprises a capacitor electrically connected to the electrical contact of the radiation absorption layer, wherein the capacitor is configured to collect charge carriers from the electrical contact of the radiation absorption layer.

16. The method of claim 12, wherein the controller is configured to deactivate the voltage comparator at a beginning of the time delay.

17. The method of claim 12, wherein the first threshold is 5-10% of a voltage a single photon generates on the electrical contact of the radiation absorption layer.

18. A radiation detector, comprising:

a radiation absorption layer configured to absorb radiation particles incident thereon and generate an electrical signal based on the radiation particles;

an electronic system configured to process the electrical signal, the electronic system comprising a transistor, the transistor comprising a gate insulator with positive charge carriers accumulated therein due to exposure of the gate insulator to radiation; and a processor configured to remove the positive charge carriers from the gate insulator by establishing an electric field across the gate insulator.

19. The radiation detector of claim 18, wherein the processor is configured to remove the positive charge carriers from the gate insulator by annealing the gate insulator.

20. The radiation detector of claim 18, wherein the processor is configured to receive a code, determine whether the code is valid, and remove the positive charge carriers from the gate insulator only when the code is valid.

21. The radiation detector of claim 18, wherein the transistor comprises a gate electrode;

wherein the processor is configured to remove the positive charge carriers from the gate insulator by establishing the electric field by applying a bias voltage on the gate electrode.

22. The radiation detector of claim 21, wherein the processor is configured to apply the bias voltage with a magnitude greater than 90% of a breakdown voltage of the gate insulator.

23. The radiation detector of claim 18, further comprising a heating element configured to heat the gate insulator.

24. The radiation detector of claim 18, wherein the electronic system comprises:

a voltage comparator configured to compare a voltage of an electrical contact of the radiation absorption layer to a first threshold;

a counter configured to register a number of radiation particles absorbed by the radiation absorption layer;

a controller;

a voltmeter;

wherein the controller is configured to start a time delay from a time at which the voltage comparator determines that an absolute value of the voltage equals or exceeds an absolute value of the first threshold;

wherein the controller is configured to cause the voltmeter to measure the voltage upon expiration of the time delay;

wherein the controller is configured to determine a number of radiation particles by dividing the voltage measured by the voltmeter by a voltage that a single radiation particle would have caused on the electrical contact;

wherein the controller is configured to cause the number registered by the counter to increase by the number of radiation particles.

25. The radiation detector of claim 24, wherein the controller comprises the transistor.

26. The radiation detector of claim 24, wherein the voltage comparator comprises the transistor.

27. The radiation detector of claim 24, further comprising a capacitor electrically connected to the electrical contact of the radiation absorption layer, wherein the capacitor is configured to collect charge carriers from the electrical contact of the radiation absorption layer.

28. The radiation detector of claim 24, wherein the controller is configured to deactivate the voltage comparator at a beginning of the time delay.

29. The radiation detector of claim 24, wherein the first threshold is 5-10% of a voltage a single photon generates on the electrical contact of the radiation absorption layer.

* * * * *